United States Patent
Bostick et al.

(10) Patent No.: US 10,812,707 B2
(45) Date of Patent: Oct. 20, 2020

(54) COMPUTING DEVICE HAPTIC TIMER FOR PHOTOGRAPHY

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/008,874

(22) Filed: Jun. 14, 2018

(65) Prior Publication Data

US 2019/0387160 A1 Dec. 19, 2019

(51) Int. Cl.
*H04N 5/232* (2006.01)
*G06F 3/01* (2006.01)
(Continued)

(52) U.S. Cl.
CPC ......... *H04N 5/23222* (2013.01); *G06F 3/016* (2013.01); *H04N 5/23216* (2013.01);
(Continued)

(58) Field of Classification Search
CPC ........... H04N 5/23222; H04N 5/23219; H04N 5/23216; G06F 3/016; G06K 9/00288; G06K 9/00228; G06T 7/20
See application file for complete search history.

(56) References Cited

U.S. PATENT DOCUMENTS 6,359,837 B1  3/2002  Tsukamoto
7,920,169 B2  4/2011  Jung et al.
(Continued)

FOREIGN PATENT DOCUMENTS

CN  104808475 A  7/2015
CN  105187710 A  12/2015

OTHER PUBLICATIONS

List of IBM Patents or Applications Treated as Related, Jun. 20, 2018, 2 pages.
(Continued)

*Primary Examiner* — Padma Haliyur
(74) *Attorney, Agent, or Firm* — Patricia A. Markison; Timothy W. Markison; Jordan A. Lewis

(57) ABSTRACT

A method includes selecting, by a first computing device having a camera function, one or more users in a capture field of the camera function. The one or more users is associated with a corresponding one or more other computing devices. The method further includes sending a haptic timer to the one or more other computing devices. The haptic timer alerts the one or more users to a countdown of when a photograph of the capture field will be taken. When an obstruction is not detected, the method further includes capturing the photograph when the haptic timer has expired and sending the photograph. The method further includes receiving feedback regarding the photograph and analyzing the feedback to determine whether a consensus has been reached. When the consensus has been reached, the method further includes providing follow-up options to the one or more other computing devices.

19 Claims, 9 Drawing Sheets

(51) Int. Cl.
*G06K 9/00* (2006.01)
*G06T 7/20* (2017.01)

(52) U.S. Cl.
CPC ..... *H04N 5/23219* (2013.01); *G06K 9/00228* (2013.01); *G06K 9/00288* (2013.01); *G06T 7/20* (2013.01)

(56) References Cited

U.S. PATENT DOCUMENTS

| | | | |
|---|---|---|---|
| 8,965,460 | B1 | 2/2015 | Rao et al. |
| 9,113,072 | B2 | 8/2015 | Kinoshita |
| 9,538,063 | B2 | 1/2017 | Morisawa |
| 9,643,722 | B1 | 5/2017 | Myslinski |
| 9,860,436 | B2 | 1/2018 | Howard et al. |
| 9,866,631 | B2 | 1/2018 | Wang |
| 2012/0105662 | A1* | 5/2012 | Staudacher ........ H04N 5/23222 348/222.1 |
| 2015/0098309 | A1 | 4/2015 | Adams |
| 2016/0065827 | A1* | 3/2016 | Dye ................... H04N 5/23206 348/211.2 |
| 2017/0180637 | A1* | 6/2017 | Lautenbach ....... H04N 5/23222 |

OTHER PUBLICATIONS

Video, no author listed (2015). Flexible Haptics in Smartwatch wristbands by Novasentis. Retrieved from https://www.youtube.com/watch?v=-GcPcHE4bLE.

\* cited by examiner

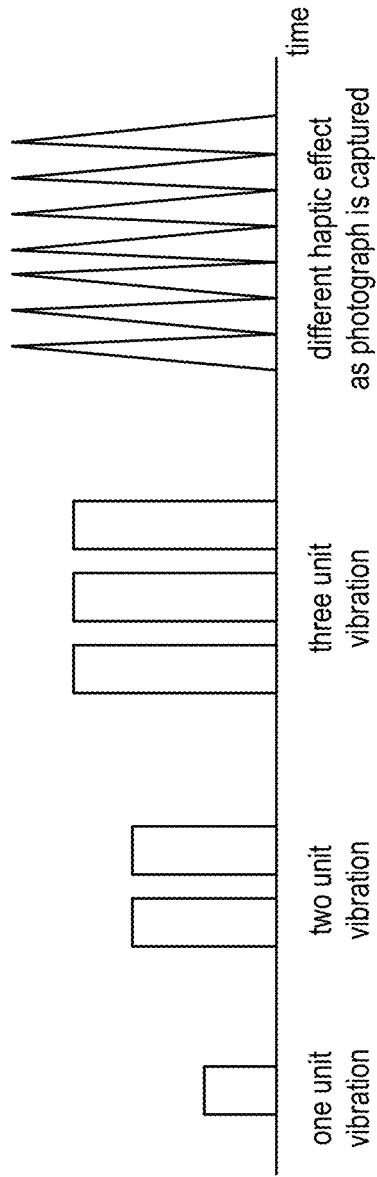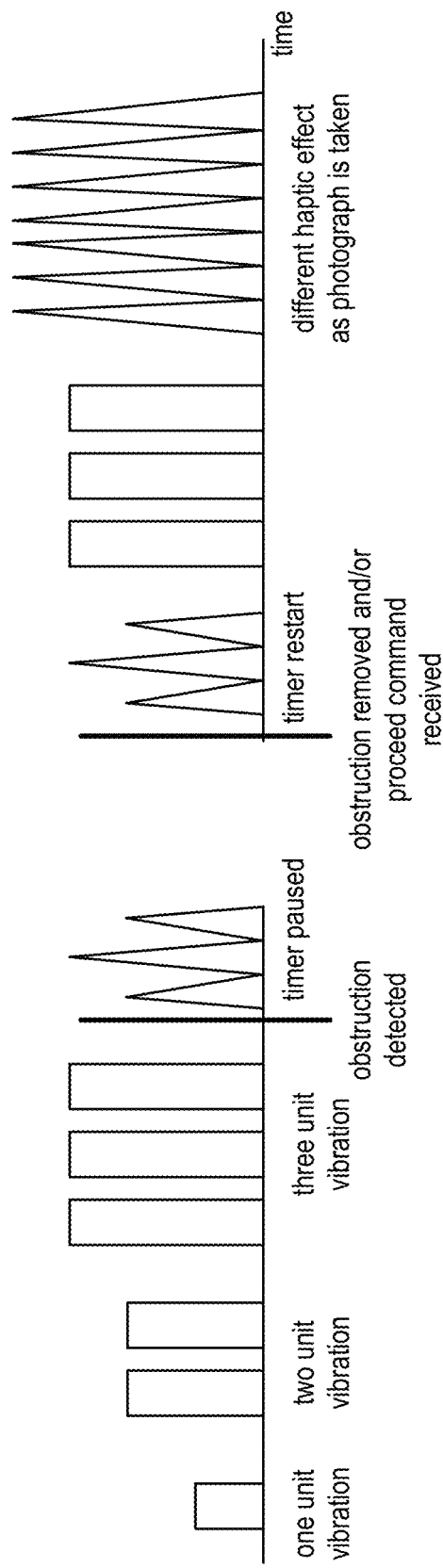

COMPUTING DEVICE HAPTIC TIMER FOR PHOTOGRAPHY

BACKGROUND

This invention relates generally to computing device photography and more particularly to a computing device haptic timer for photography.

SUMMARY

According to an embodiment of the invention, a first computing device having a camera function selects one or more users in a capture field of the camera function. The one or more users associated with a corresponding one or more other computing devices. The first computing device sends a haptic timer to the one or more other computing devices, where the haptic timer alerts the one or more users to a countdown of when a photograph of the capture field will be taken. When an obstruction is not detected, the first computing device captures the photograph when the haptic timer has expired and sends the photograph to the one or more other computing devices. The first computing device receives feedback from the one or more other computing devices regarding the photograph and analyzes the feedback to determine whether a consensus has been reached. When the consensus has been reached, the first computing device provides follow-up options to the one or more other computing devices.

BRIEF DESCRIPTION OF THE SEVERAL VIEWS OF THE DRAWING(S)

FIGS. 5A-5B are schematic block diagrams of examples of haptic timer effects in accordance with the present invention.

DETAILED DESCRIPTION OF THE INVENTION

Figure 1:
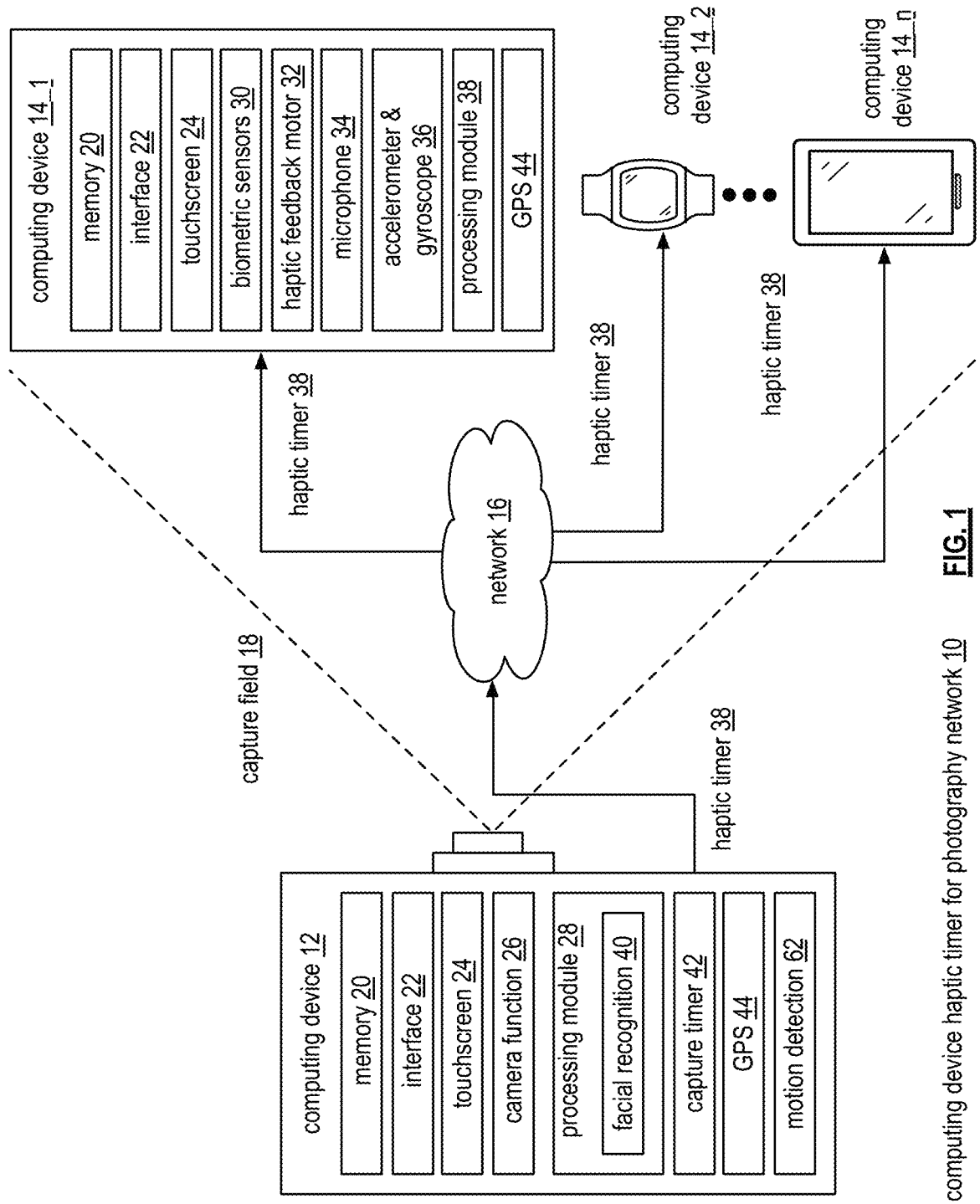
FIG. 1 is a schematic block diagram of an embodiment of a computing device haptic timer for photography network in accordance with the present invention.

FIG. 1 is a schematic block diagram of an embodiment of a computing device haptic timer for photography network 10 that includes computing device 12 and computing devices 14_1 through 14_n. Computing device 12 is paired with computing devices 14_1 through 14_n via network 16. Network 16 may include one or more wireless and/or wire lined communication systems; one or more non-public intranet systems and/or public internet systems; and/or one or more local area networks (LAN) and/or wide area networks (WAN). Alternatively, computing device 12 is paired with computing devices 14_1 through 14_n by Bluetooth, Bluetooth Low Energy (LE), and/or ultrasound such that computing device 12 is operable to communicate with and transmit data to computing devices 14_1 through 14_n.

Computing device 12 includes memory 20, interface 22, touchscreen 24, camera function 26, processing module 28 including a facial recognition function 40, capture timer 42, global positioning system (GPS) 44, and motion detection 62. Computing device 12 may be any portable computing device that includes a camera function such as a smartphone, a cell phone, a digital assistant, a digital music player, a digital video player, a laptop computer, a handheld computer, a tablet, a smartwatch, a dedicated camera, etc.

Computing devices 14_1 through 14_n include memory 20, interface 22, touchscreen 24, biometric sensors 30, haptic feedback motor 32, microphone 34, an accelerometer and gyroscope 36, processing module 38, and GPS 44. Computing devices 14_1 through 14_n may be any portable computing device that can be held or worn by an individual in order to feel a haptic effect (e.g., vibration, buzzing, etc.). For example computing device 14_2 is a smartwatch and 14_n is a smartphone that is held or worn (e.g., in an arm band) by a user. Computing devices 14_1 through 14_n may further be a cell phone (if held or worn), a digital assistant (if held or worn), a digital music player (if held or worn), a digital video player (if held or worn), a tablet (if held or worn), etc. Interface 22 includes software and hardware to support one or more communication links via the network 16 indirectly and/or directly.

In an example of operation, computing device 12 selects one or more users in a capture field 18 of computing device 12's camera function 26 where the one or more users are associated with computing devices 14_1 through 14_n. An example of selecting the one or more users is discussed with reference to FIGS. 2A-2B. Computing device 12 sends a haptic timer 38 to computing devices 14_1 through 14_n via network 16. The haptic timer 38 alerts the one or more users to a countdown of when a photograph of the capture field 18 will be taken. For example, the users wearing computing devices 14_1 through 14_n feel a physical sensation produced by the haptic feedback motor 32 to represent a countdown to the photograph such as a series of buzzing/vibrating sensations (e.g., one buzz, two buzzes, 3 buzzes, shoot). While the invention focuses on a haptic timer for a photograph, the haptic timer 38 could be used as a countdown to a video or series of photographs. The user associated with computing device 12 may be one of the one or more users if, for example, computing device 12 is resting on a surface, a tripod, or on a selfie stick, and the user associated with computing device 12 is also associated with one of computing devices 14_1 through 14_n (e.g., the photographer is using a smartphone on a selfie stick to take a photograph and is also wearing a smartwatch to receive the haptic timer or the selfie stick handle is operable to receive the haptic timer).

When there are no obstructions present, computing device 12 captures the photograph when the haptic timer 38 has expired. An obstruction may be a moving object entering the capture filed 18 that is in between computing device 12 and any one of computing devices 14_1 through 14_n (e.g., a car drives into the capture field 18), an individual captured in the capture field 18 that is not the one or more users (e.g., a "photobomber"), and/or a blocked facial feature of a user of the one or more users (e.g., a user has her back turned to the camera, a user's arm is blocking another user's face, etc.). Stationary objects not blocking the one or more user's faces (e.g., statues, signs, trees, etc.) will not be considered obstructions unless the computing device 12 specifically includes stationary objects as obstructions in set-up. Computing device 12 automatically detects an obstruction using a motion detection function 62 (e.g., to detect the moving object), and/or a facial recognition function 40 (e.g., to detect unidentified users and/or blocked facial features). An example of what occurs when there is an obstruction during the haptic timer 38 is discussed with reference to FIG. 4.

Computing device 12 sends the photograph to computing devices 14_1 through 14_n and receives feedback regarding the photograph (e.g., the photograph is liked or disliked, and/or a camera parameter adjustment is requested) from the users associated with computing devices 14_1 through 14_n. Feedback can be manually submitted by the users of computing devices 14_1 through 14_n (e.g., the user clicks a "thumbs up" to indicate that the photograph is satisfactory) or derived by user behavior and/or measurements (e.g., facial reactions captured by the camera function 26 and interpreted by facial recognition 40, movement data captured by the accelerometer and gyroscope 36, biometric measurements captured by the biometric sensors 30, passive listening captured by the microphone 34, etc.). An example of receiving feedback regarding the photograph is discussed with reference to FIG. 3.

Computing device 12 analyzes the feedback to determine whether a consensus has been reached. Computing device 12 determines whether a consensus has been reached by determining whether a threshold number (e.g., set as a majority of users or unanimous) of computing devices 14_1 through 14_n has returned favorable feedback (e.g., feedback indicating that no adjustments are required, the photograph is satisfactory, etc.). When the threshold number of computing devices 14_1 through 14_n has returned favorable feedback, the computing device 12 determines that the consensus has been reached. When the threshold number of computing devices 14_1 through 14_n has not returned favorable feedback, the computing device 12 determines that the consensus has not been reached.

When the consensus has been reached, computing device 12 provides follow-up options to computing devices 14_1 through 14_n. The follow-up options include download photograph, transmit photograph, post photograph to social media, edit photograph (e.g., add a filter, add a caption, etc.), and/or delete photograph. The photograph can be captured on cloud storage and computing device 12 may require each user associated with computing devices 14_1 through 14_n to approve a selected follow-up option before that option can be executed. For example, before a user can post the photograph to social media, all users must agree. The approval can be manual. For example, a user views the photograph on his or her smartwatch and selects how this photograph can be used (e.g., "I'm happy for this to be shared on social media," or "I'm OK sharing this picture with the group but it must not be posted online"). This selection can occur along with the other follow-up options or after another user has selected a follow-up option that triggers the approval of other users. Further, a user may set sharing preferences as a default setting (e.g., "I never want photographs posted online").

Alternatively, approval of a follow-up option can be derived from user behavior/reactions using the same techniques used to derive each user's feedback of the photograph (e.g., facial reactions captured by the camera function 26 and interpreted by facial recognition 40, movement data captured by the accelerometer and gyroscope 36, biometric measurements captured by the biometric sensors 30, passive listening captured by the microphone 34, etc.). For example, the camera function 26 of computing device 12 continues to capture live video of the users included in the photograph to gauge their reaction to the photograph and to the follow-up options. Facial recognition 40 is used to analyze the facial expressions of the users after viewing the photograph (e.g., frowning, laughing, smiling, shaking head, nodding head, etc.) and classify reactions as happy (i.e., satisfied with the photograph) or unhappy (i.e., unsatisfied with the photograph and another is needed). If all users seem to be delighted by the photograph, approval to post to social media is derived.

When the consensus has not been reached, computing 12 determines whether the feedback indicates that one or more camera parameters require adjustment (e.g., the photograph is too bright, flash is needed, aperture needs adjusting, focus is off, etc.). If so, computing device 12 adjusts the one or more camera parameters in accordance with the feedback and sends a second haptic timer to computing devices 14_1 through 14_n to initiate countdown to taking a new photograph. If no camera parameter adjustments are needed, computing device 12 sends the second haptic timer to computing devices 14_1 through 14_n to initiate countdown to taking a new photograph.

Figure 2A:
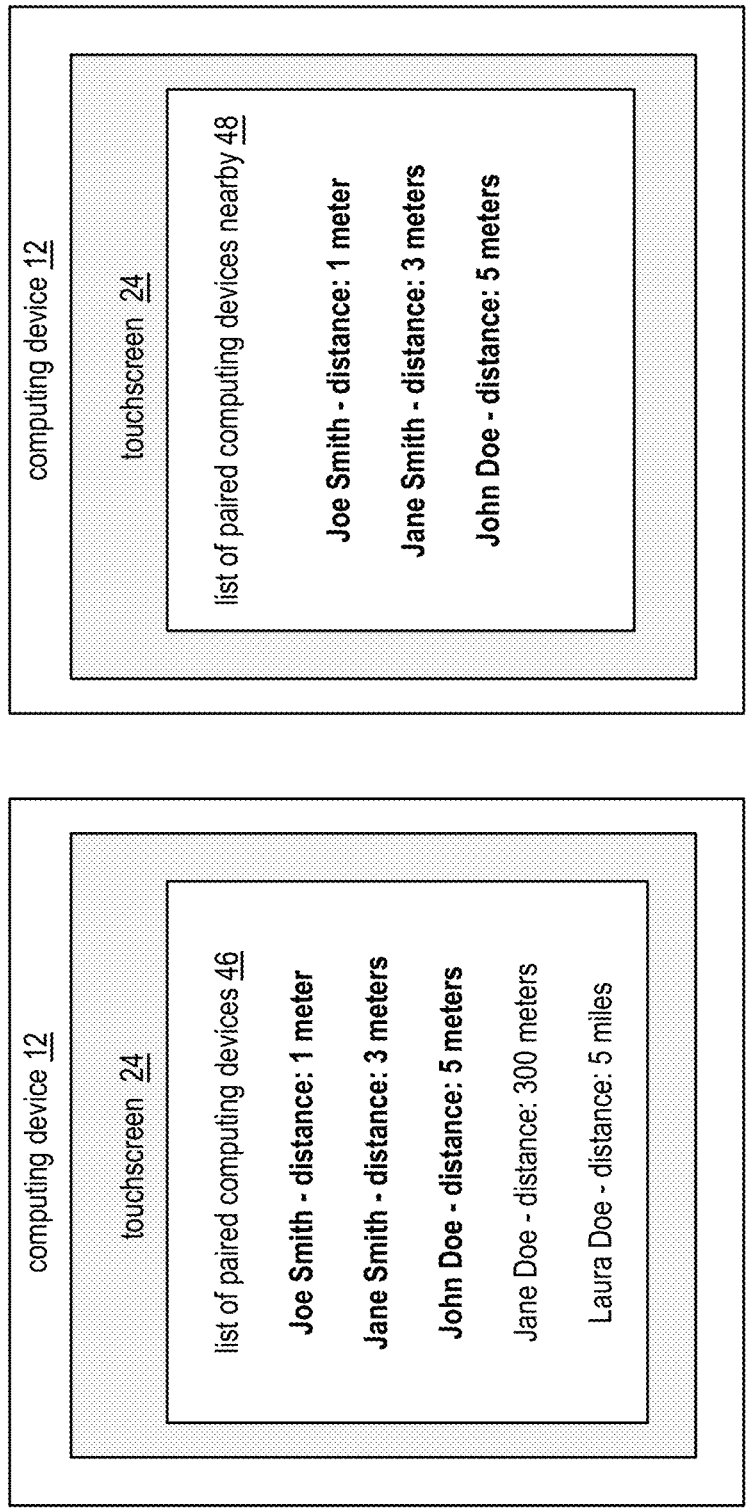
FIGS. 2A-2B are schematic block diagrams of examples of selecting one or more users in accordance with the present invention.
Figure 2B:
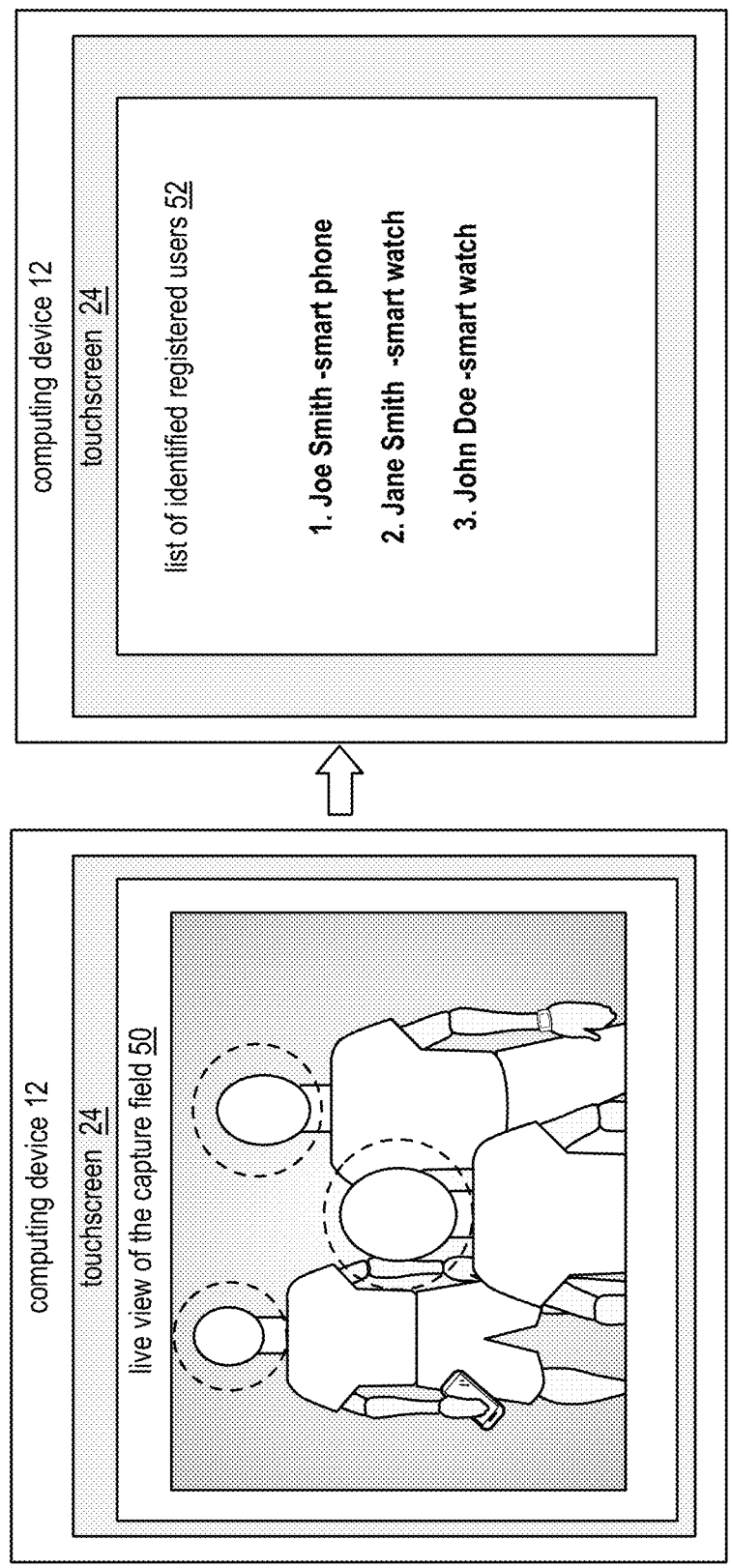

FIGS. 2A-2B are schematic block diagrams of examples of selecting one or more users. FIG. 2A includes two options for selecting the one or more users. In a first example, touchscreen 24 of computing device 12 displays a list of paired computing devices 26. For example, one or more computing devices (such as computing devices 14_1 through 14_n of FIG. 1) are previously paired with computing device 12. The pairing may be established via Bluetooth LE or via a network (e.g., network 16) and enables computing device 12 to communicate with the one or more computing devices. The user of computing device 12 can select users to include in the photograph from a list of paired computing devices 26 using the touchscreen 24. Computing device 12 may communicate with each paired computing device to determine its current location relative to computing device 12 using a GPS 44 function and include this distance in the list of paired computing devices 26 for reference.

For example, Joe Smith's computing device is 1 meter away, Jane Smith's computing device is 3 meters away, John Doe's computing device is 5 meters away, Jane Doe's computing device is 300 meter's away, and Laura Doe's computing device is 5 miles away. Here, the user of computing device 12 has selected Joe Smith, Jane Smith, and Jane Doe (indicated by bolded font) because they at a close enough distance to be in the photograph. In the second example shown in FIG. 2A, the touchscreen 24 of computing device 12 only displays a list of paired computing devices nearby 48. In this example, Jane Doe and Laura Doe are eliminated as options because their current locations are outside of a preset distance.

FIG. 2B shows an alternative embodiment for selecting one or more users. The touchscreen 24 of computing device 12 displays a live view of the capture field 50 and the user of computing device 12 selects one or more individuals as seen through the live view. Computing device 12 uses a facial recognition function to identify the one or more individuals and performs a lookup of the identified one or more individuals in a list of identified registered users 50. For example, based on the selection of three individuals seen through the live view, computing device 12 recognizes those individuals as Joe Smith, Jane Smith, and John Doe. Computing device 12 looks for those names on the list of registered users 52 and selects those users from the list. If the selected user is associated with a computing device that is not paired with computing device 12, the computing device is paired with computing device 12 at this time via Bluetooth or the network.

Figure 3:
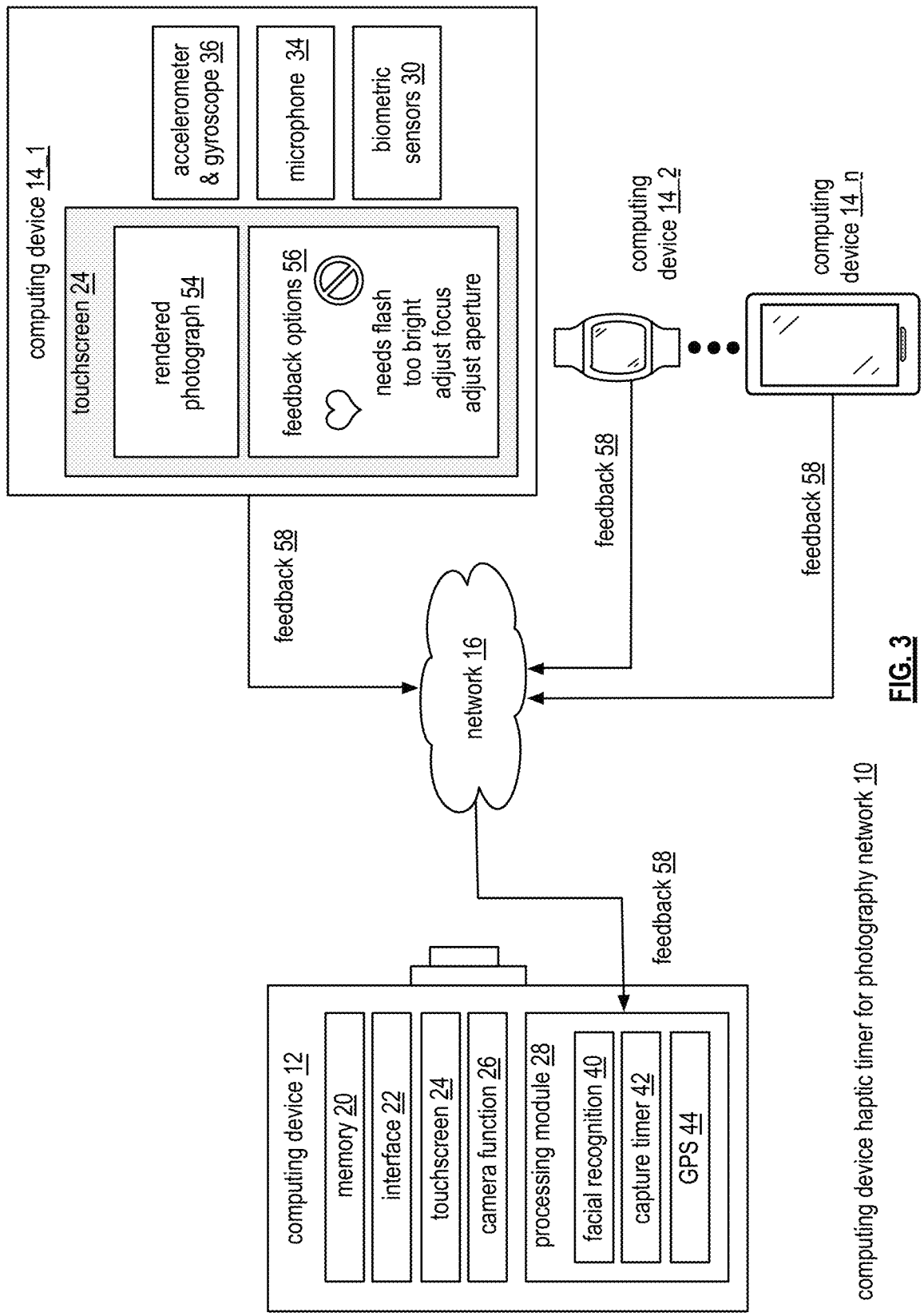
FIG. 3 is a schematic block diagram of an embodiment of the computing device haptic timer for photography network in accordance with the present invention.

FIG. 3 is a schematic block diagram of an embodiment of the computing device haptic timer for photography network 10 that includes computing device 12, computing devices 14_1 through 14_n, and network 16. In this example, computing devices 14_1 through 14_n have received the rendered photograph 54 and have responded to computing device 12 with feedback 58. Feedback 58 includes an indication that the photograph is satisfactory, an indication that the photograph is not satisfactory, and/or an indication that a camera function parameter requires adjustment. Camera function parameters includes any adjustable feature of the camera function 26 such as focus, aperture, angle, exposure, zoom, etc. Feedback 58 may be manually entered by computing devices 14_1 through 14_n or derived from user reactions and/or behavior. For example, computing device 14_1 receives rendered photograph 54 as well as feedback options 56 displayed on touchscreen 24. Feedback options 56 include a "love" button indicated by a heart symbol and a "no" button indicated by a cross-out symbol. The user of computing device 1_1 may select either to indicate whether the photograph is acceptable. Other buttons may include smiley face/frown face, thumbs up/thumbs down, etc. The feedback options 56 also include a list of camera parameter adjustments that may be needed such as "needs flash," "too bright," "adjust focus," "adjust aperture, etc." These user selections are included in feedback 58.

Alternatively, feedback 58 is derived from user behavior/reactions. For example, the camera function 26 of computing device 12 continues to capture live video of the users included in the photograph to gauge their reaction. Facial recognition 40 is used to analyze the facial expressions of the users after viewing the photograph (e.g., frowning, laughing, smiling, shaking head, nodding head, etc.) and classify reactions as happy (i.e., satisfied with the photograph) or unhappy (i.e., unsatisfied with the photograph and another is needed). As another example arm and body movements of the users of computing devices 14_1 through 14_n are tracked using the accelerometer and gyroscope 36 embedded in each of computing devices 14_1 through 14_n. Data from the accelerometer and gyroscope 36 is analyzed by computing device 12 to determine whether the photograph is satisfactory or not. For example, a user shaking their hands from side-to-side may indicate displeasure at the photograph, a user jumping up and down may indicate excitement towards the photograph, etc.

As another example, biometric signals detected from biometric sensors 30 embedded in each of computing devices 14_1 through 14_n such as heart rate, skin temperature, and blood pressure can be analyzed to indicate a user's reaction and emotions toward a photograph. As another example, a microphone 34 on each computing devices 14_1 through 14_n can capture conversation and use passive listening to look for keywords that indicate a reaction to the photograph. For example, if passive listening comes across the keyword "awful" the wider context of the sound bite is analyzed by computing device 12. For instance, the wider sound bite "I look awful in this picture" is analyzed. Computing device 12 derives unsatisfactory feedback 58 for such a sound bite.

Figure 4:
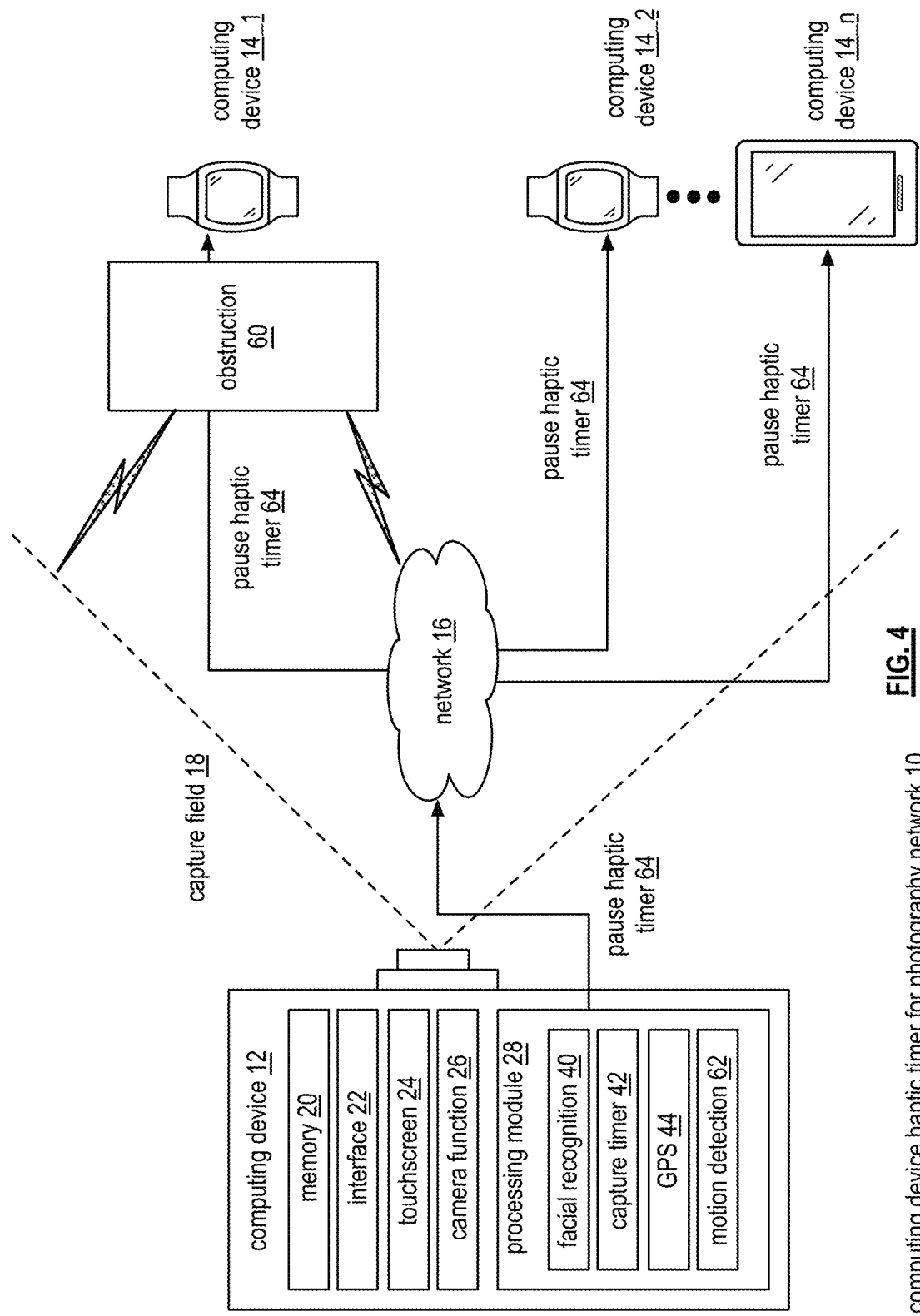
FIG. 4 is a schematic block diagram of an embodiment of the computing device haptic timer for photography network in accordance with the present invention.

FIG. 4 is a schematic block diagram of an embodiment of the computing device haptic timer for photography network 10. FIG. 4 includes computing device 12, computing devices 14_1 through 14_n, and network 16. In this example, an obstruction 60 is detected during the haptic timer. An obstruction 60 may be a moving object entering the capture field 18 that is in between computing device 12 and any one of computing devices 14_1 through 14_n (e.g., a car drives into the capture field) 18, an individual captured in the capture field 18 that is not the one or more users (e.g., a "photobomber"), and/or a blocked facial feature of a user of the one or more users (e.g., a user has her back turned to the camera, a user's arm is blocking another user's face, etc.). Stationary objects not blocking the one or more user's faces (e.g., statues, signs, trees, etc.) will not be considered obstructions unless the computing device 12 specifically includes stationary objects as obstructions in set-up. Computing device 12 automatically detects an obstruction using a motion detection function 62 (e.g., to detect the moving object), and/or a facial recognition function 40 (e.g., to detect unidentified users and/or blocked facial features).

When obstruction 60 is detected, computing device 12 pauses the haptic timer and sends a pause haptic timer 64 signal having a haptic effect (e.g., a different type of physical sensation than the timer) to each of the computing devices 14_1 through 14_n to indicate that the timer has been paused. Computing device 12 waits until obstruction 60 has been removed from the capture field 18 and restarts the haptic timer. For example, obstruction 60 is a car that drove into the capture field 18 and is blocking the user of computing device 14_1. As soon as the car has driven out of the capture field and is not blocking anyone in the photograph, the haptic timer restarts. Computing device 12 send a haptic timer restart message to each of the computing devices 14_1 through 14_n. The haptic timer restart message may include a similar haptic effect to the pause haptic timer signal (e.g., a different type of physical sensation than the timer) to let users know that the timer will restart.

Alternatively, after computing device 12 has paused the haptic timer, computing device 12 sends a live view of the capture field 18 to computing devices 14_1 through 14_n allowing the users of computing devices 14_1 through 14_n to assess whether obstruction 60 is a problem. For example, obstruction 60 is an unknown individual but the users of computing devices 14_1 through 14_n do not mind his or her presence in the photograph (e.g., the photograph is with a celebrity or mascot not associated with a computing device). A user of one of computing devices 14_1 through 14_n can select a "proceed" command to restart the timer. When obstruction 60 has been removed from the capture field 18 or a proceed command is received, computing device 12 restarts the haptic timer. Computing device 12 send a haptic timer restart message to each of the computing devices 14_1 through 14_n.

FIGS. 5A-5B are schematic block diagrams of examples of haptic timer effects. FIG. 5A shows a haptic timer effect 66 played on each of computing devices 14_1 through 14_n (e.g., via the haptic feedback motor 32) during a haptic timer. In this example, the users of computing devices 14_1 through 14_n experience the haptic timer as a countdown with a 1 buzz vibration sensation, a pause, a 2 buzz vibration sensation of increasing power, a pause, a 3 buzz vibration sensation of increasing power, and a pause where each buzz vibration sensation and pause may last for 1-2 seconds for example. A different haptic effect will occur as the photograph is taken. For example, the different haptic effect may be a series of pulse vibrations lasting 0.25 seconds each with a stronger vibration sensation than the timer buzz vibration sensations.

FIG. 5B depicts an example of a haptic timer effect played on each of computing devices 14_1 through 14_n (e.g., via the haptic feedback motor 32) during a haptic timer when an obstruction is detected 68. The haptic timer effect is played as discussed in FIG. 5A but is paused when an obstruction is detected. A different haptic effect is played to let the users of computing devices 14_1 through 14_n know that the haptic timer is paused. For example, the different haptic effect for a paused haptic timer may be a short series of pulse vibrations lasting 0.25 seconds each with a lighter vibration sensation than the timer buzz vibration sensations. When the obstruction has been removed or the proceed command is received, the timer is restarted. A different haptic effect is played to let the users of computing devices 14_1 through 14_n know that the haptic timer has been restarted. This can be the same haptic effect used to indicate a paused haptic timer. The haptic timer restarts by repeating the last haptic effect prior to the obstruction being detected (here, it is the 3 buzz vibration sensation) and continues.

Figure 6A:
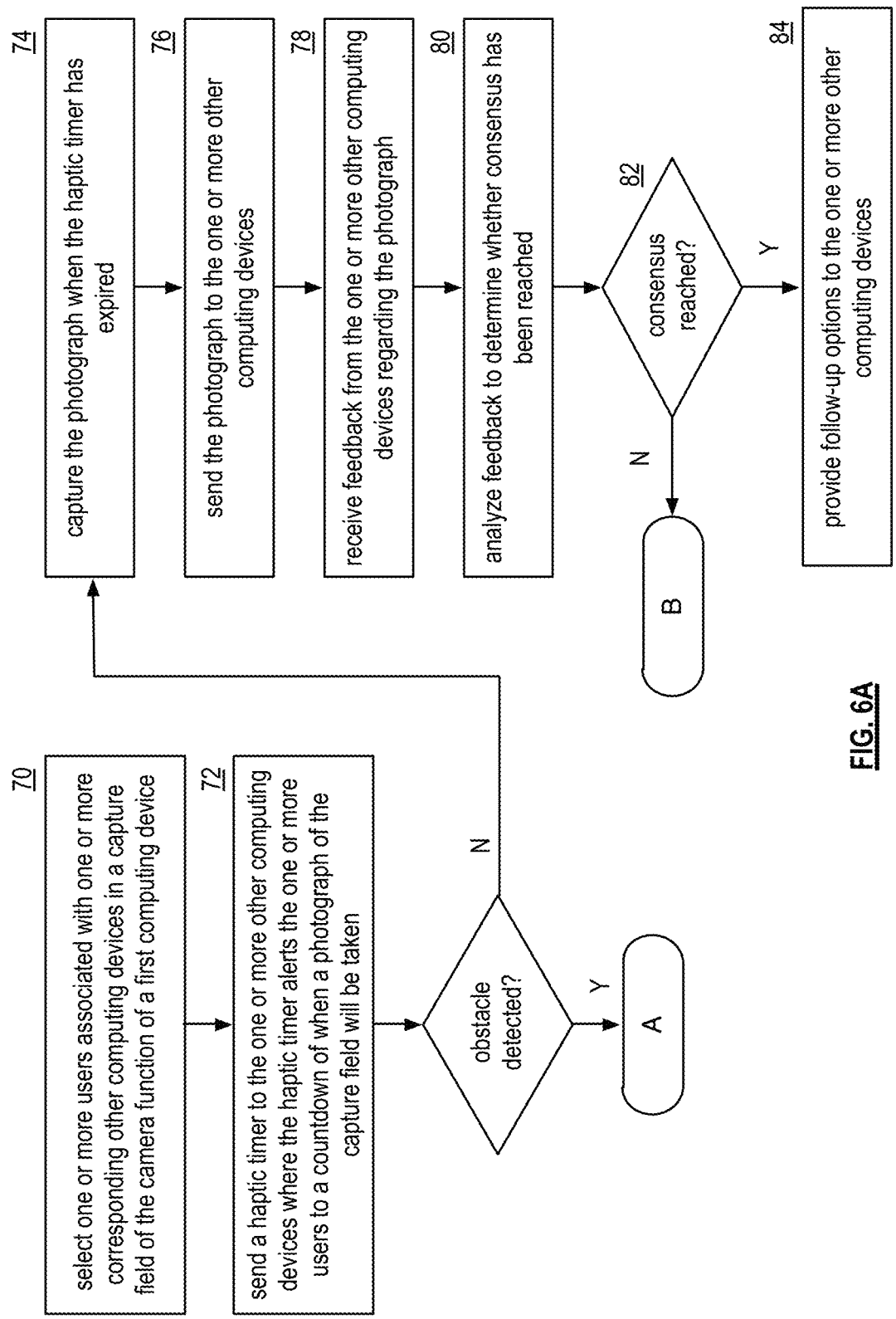
FIGS. 6A-6D are logic diagrams of an example of a method of a computing device haptic timer for photography in accordance with the present invention.

FIGS. 6A-6D are logic diagrams of an example of a method of a computing device haptic timer for photography. FIG. 6A begins with step 70 where a first computing device (e.g., a smartphone, dedicated camera, etc.) having a camera function selects one or more users in a capture field of the camera function where the one or more users is associated with a corresponding one or more other computing devices (e.g., smartphones if held, smartwatches, etc.). For example, the first computing device selects the one or more users from a list of users associated with computing devices paired (e.g., via Bluetooth LE, a wireless network, etc.) with the first computing device. The list of users may include distances of the users to the first computing device. As another example, the first computing device selects one or more individuals through a live view of the capture field using a touchscreen function and identifies the one or more individuals using a facial recognition function. The first computing device performs a lookup of the identified one or more individuals in a database of registered users to correlate the identified one or more individuals to the one or more users associated with the corresponding one or more other computing devices.

The method continues with step 72 where the first computing device sends a haptic timer to the one or more other computing devices. The haptic timer alerts the one or more users to a countdown of when a photograph of the capture field will be taken via a physical sensation (e.g., a series of buzzing sensations). When an obstruction is detected, the method continues with step A of FIGS. 6B-6C. When an obstruction is not detected, the method continues with step 74 where the first computing device captures the photograph when the haptic timer has expired.

The method continues with step 76 where the first computing device sends the photograph to the one or more other computing devices. The method continues with step 78 where the first computing device receives feedback from the one or more other computing devices regarding the photograph. The feedback includes an indication that the photograph is satisfactory (e.g., a manual input such as a user selected smiley face or thumbs-up, or a derived input using facial recognition, movement data, biometric measurements, passive listening, etc.), an indication that the photograph is not satisfactory (e.g., a manual input such as a user selected frown face or thumbs-down, or a derived input using facial recognition, using movement data, biometric measurements, passive listening, etc.), and/or an indication that a camera function parameter requires an adjustment (e.g., the photo is too bright, needs flash, requires aperture adjustment, requires focus adjustment, etc.).

The method continues with step 80 where the first computing device analyzes the feedback to determine whether a consensus has been reached. The first computing device determines whether a consensus has been reached by determining whether a threshold number (e.g., set as a majority of users or unanimous) of the one or more other computing devices has returned favorable feedback (e.g., feedback indicating that no adjustments are required, the photograph is satisfactory, etc.). When the threshold number of the one or more other computing devices has returned favorable feedback, the first computing device determines that the consensus has been reached. When the threshold number of the one or more other computing devices has not returned favorable feedback, the first computing device determines that the consensus has not been reached.

When the consensus has been reached at step 82, the method continues with step 84 where the first computing device provides follow-up options to the one or more other computing devices. The follow-up options include download photograph, transmit photograph, post photograph to social media, edit photograph (e.g., add a filter, add a caption, etc.), and/or delete photograph. The photograph can be captured on cloud storage and the first computing device may require each user associated with the one or more other computing devices to approve a selected follow-up option before that option can be executed. For example, before a user can post the photograph to social media, all users must agree. The approval can be manual. For example, a user views the photograph on his/her smartwatch and selects how this photograph can be used (e.g., "I'm happy for this to be shared on social media, or "I'm OK sharing this picture with the group but it must not be posted online"). This selection can occur along with the other follow-up options or after another user has selected a follow-up option that triggers the approval of other users.

Further, a user may set sharing preferences as a default setting (e.g., "I never want photographs posted online"). As another example, approval of follow-up option can be derived using the same techniques used to measure each user's feedback to the photograph (e.g., data gathered from facial recognition, movement, biometric measurements, passive listening, etc.). For example, if all users seem to be delighted by the photograph, approval to post to social media is derived. When the consensus has not been reached at step 82, the method continues with step B of FIG. 6D.

Figure 6C:
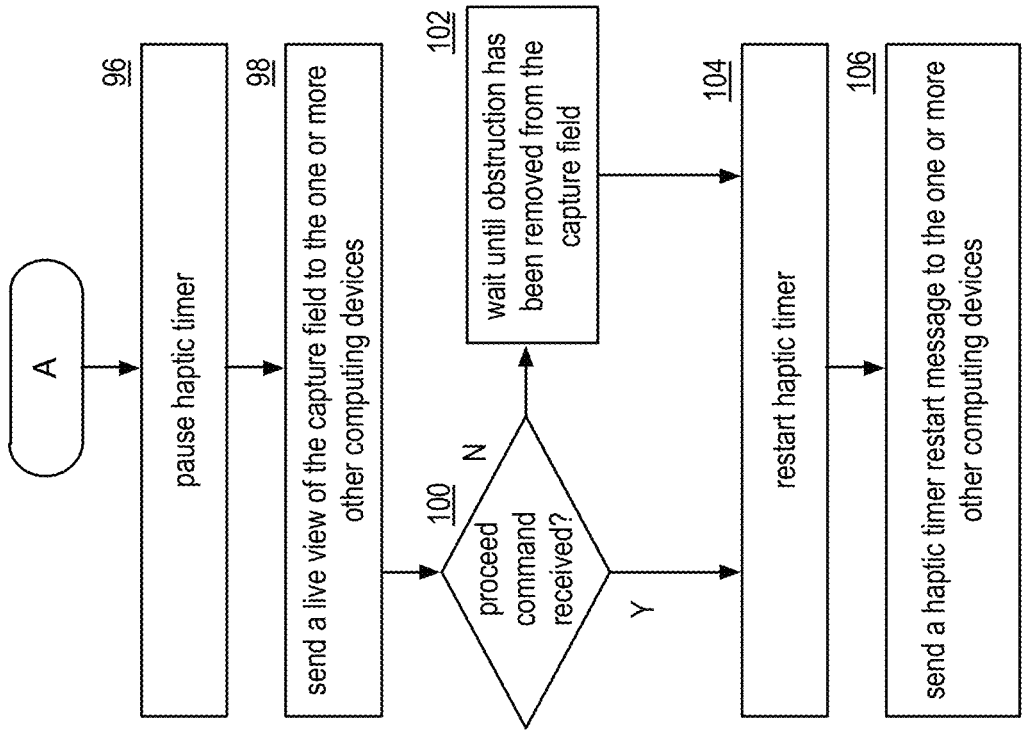
Figure 6B:
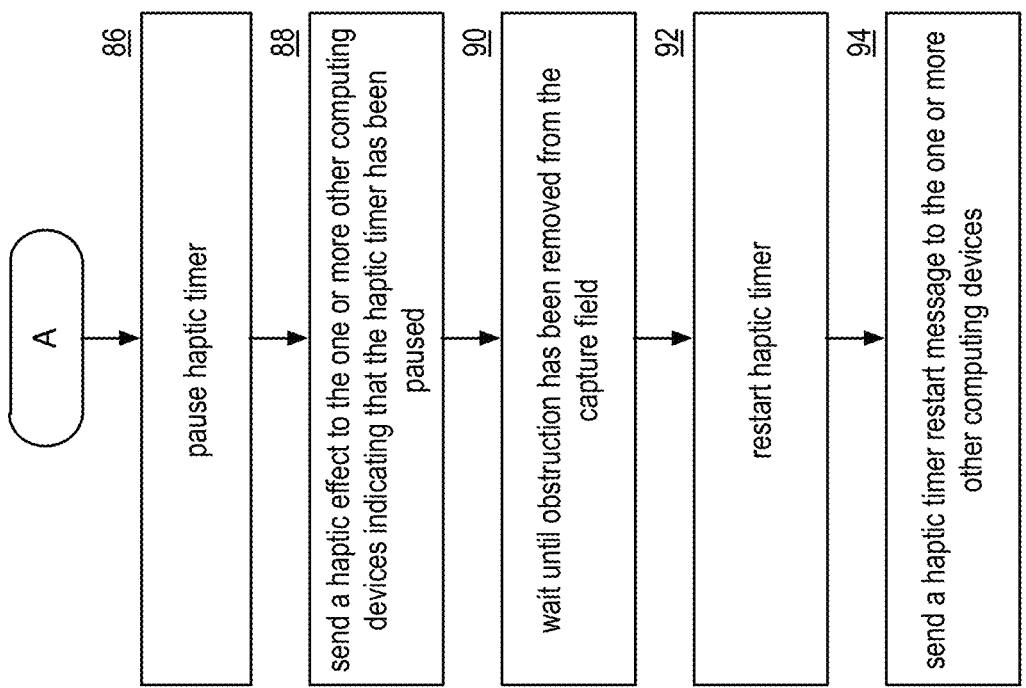

FIG. 6B begins with step A from FIG. 6A where an obstruction has been detected. An obstruction may be a moving object entering the capture field of the camera function that is the first computing device and the one or more users (e.g., a car drives into the capture field), an individual captured in the capture field of the camera function that is not the one or more users (e.g., a "photobomber"), and/or a blocked facial feature of a user of the one or more users (e.g., a user has her back turned to the camera, a user's arm is blocking another user's face, etc.). Stationary objects not blocking the one or more user's faces (e.g., statues, signs, trees, etc.) will not be considered obstructions unless the first computing device specifically includes stationary objects as obstructions in set-up. The first computing device automatically detects an obstruction using a motion detection function (e.g., to detect the moving object), and/or a facial recognition function (e.g., to detect unidentified users and/or blocked facial features).

The method continues with step 86 where the first computing device pauses the haptic timer. The method continues with step 88 where the first computing device sends a haptic effect to the one or more other computing devices indicating that the haptic timer has been paused. The method continues with step 90 where the first computing device waits until the obstruction has been removed from the capture field. The method continues with step 92 where the first computing device restarts the haptic timer. The method continues with step 94 where the first computing device sends a haptic timer restart message to the one or more other computing devices.

FIG. 6C begins with step A from FIG. 6A where an obstruction has been detected. The method continues with step 96 where the first computing device pauses the haptic timer. The method continues with step 98 where the first computing device sends a live view of the capture field to the one or more other computing devices. The method continues with step 100 where the first computing device determines whether a proceed command has been received from the one or more other computing devices. When a proceed command has not been received, the method continues to step 102 where the first computing device waits until the obstruction has been removed from the capture field. When a proceed command has been received or the obstruction has been removes, the method continues with step 104 where the first computing device restarts the haptic timer. The method continues with step 106 where the first computing device sends a haptic timer restart message to the one or more other computing devices.

Figure 6D:
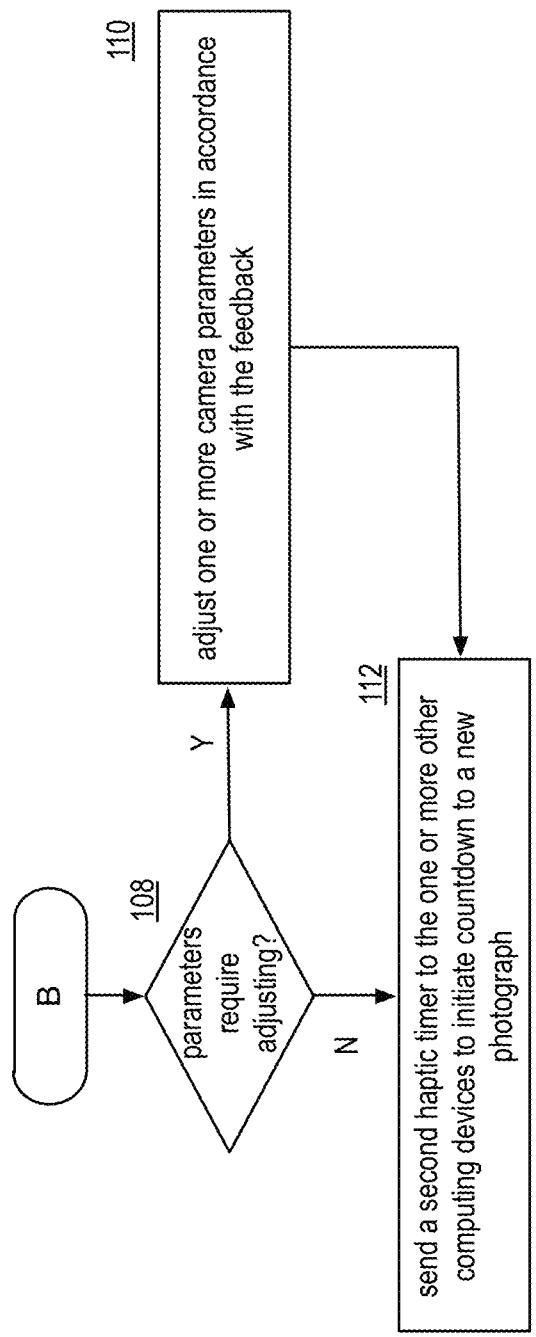

FIG. 6D begins with step B from FIG. 6A where the consensus has not been reached. The method continues with step 108 where the first computing device determines whether the feedback indicates that one or more camera parameters require adjustment. When the feedback indicates that one or more camera parameters require adjustment, the method continues with step 110 where the first computing device adjusts the one or more camera parameters in accordance with the feedback. For example, the feedback indicates that the photograph is too dark and a flash is needed so the first computing device turns on the flash.

The method continues with step 112 where the first computing device sends a second haptic timer to the one or more other computing devices to initiate countdown to taking a new photograph. When the feedback does not indicate that one or more camera parameters require adjustment, the method continues with step 112 where the first computing device sends a second haptic timer to the one or more other computing devices to initiate countdown to taking a new photograph.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

selecting, by a camera computing device, one or more users in a capture field of the camera computing device, wherein the one or more users is associated with a corresponding one or more other computing devices;

sending, by the camera computing device, a haptic timer to the one or more other computing devices, wherein the haptic timer alerts the one or more users to a countdown of when a photograph of the capture field will be taken;

determining, by the camera computing device, whether an obstruction is present in the capture field;

when the obstruction is not detected:

capturing, by the camera computing device, the photograph when the haptic timer has expired;

sending, by the camera computing device, the photograph to the one or more other computing devices;

receiving, by the camera computing device, feedback from the one or more other computing devices regarding opinion of the one or more users regarding the photograph;

analyzing, by the camera computing device, the feedback to determine whether a consensus of the opinion of the one or more users regarding the photograph has been reached; and when the consensus has been reached:

providing, by the camera computing device, follow-up options regarding user interaction with the photograph to the one or more other computing devices;

when the obstruction is detected:

pausing, by the camera computing device, the haptic timer;

sending, by the camera computing device, a live view of the capture field to the one or more other computing devices;

prior to the obstruction being removed from the capture field, determining, by the camera computing device, whether a proceed command has been received from the one or more other computing devices;

when the obstruction has been removed or when the proceed command has been received, restarting, by the camera computing device, the haptic timer; and sending, by the camera computing device, a haptic timer to the one or more other computing devices.

2. The method of claim 1 further comprises:
when the obstruction is detected:
pausing, by the camera computing device, the haptic timer;
sending, by the camera computing device, a haptic effect to the one or more other computing devices indicating that the haptic timer has been paused;
waiting, by the camera computing device, until the obstruction has been removed from the capture field;
restarting, by the camera computing device, the haptic timer; and
sending, by the camera computing device, a haptic timer restart message to the one or more other computing devices.

3. The method of claim 1 further comprises:
selecting, by the camera computing device, the one or more users from a list of users associated with computing devices paired with the first computing camera.

4. The method of claim 1 further comprises:
selecting, by the camera computing device, one or more individuals through a live view of the capture field using a touchscreen function;
identifying, by the camera computing device, the one or more individuals using a facial recognition function; and
performing, by the camera computing device, a lookup of the identified one or more individuals in a database of registered users to correlate the identified one or more individuals to the one or more users associated with the corresponding one or more other computing devices.

5. The method of claim 1, wherein the feedback includes one or more of:
an indication that the photograph is satisfactory;
an indication that the photograph is not satisfactory; and
an indication that a camera function parameter requires an adjustment.

6. The method of claim 1, wherein the determining whether the consensus of the opinion of the one or more users regarding the photograph has been reached comprises:
determining, by the camera computing device, whether a threshold number of the one or more other computing devices has returned favorable feedback; and
when the threshold number of the one or more other computing device has returned favorable feedback, determining, by the first computing device, that the consensus has been reached; and
when the threshold number of the one or more other computing devices has not returned favorable feedback, determining, by the camera computing device, that the consensus has not been reached.

7. The method of claim 1, wherein, the follow-up options include one or more of:
download photograph;
transmit photograph;
post photograph to social media;
edit photograph; and
delete photograph.

8. The method of claim 1, wherein the determining whether the obstruction is present in the capture field comprises one or more of:
detecting, by the camera computing device, a moving object between the camera computing device and the one or more users;
detecting, by the camera computing device, an individual in the capture field that is not the one or more users; and
detecting, by the camera computing device, that facial features of a user of the one or more users is blocked.

9. The method of claim 1 further comprises:
when the consensus has not been reached:
when the feedback indicates that one or more camera parameters require adjustment:
adjusting, by the camera computing device, the one or more camera parameters in accordance with the feedback; and
sending, by the camera computing device, a second haptic timer to the one or more other computing devices to initiate countdown to taking a new photograph; and
when the feedback does not indicate that one or more camera parameters require adjustment:
sending, by the camera computing device, the second haptic timer to the one or more other computing devices to initiate countdown to taking the new photograph.

10. A camera computing device comprises:
an interface;
memory; and
a processing module operably coupled to the memory and the interface, wherein the processing module is operable to:
select one or more users in a capture field of the camera computing device, wherein the one or more users is associated with a corresponding one or more other computing devices;
send a haptic timer to the one or more other computing devices, wherein the haptic timer alerts the one or more users to a countdown of when a photograph of the capture field will be taken;
determine whether an obstruction is present in the capture field;
when an obstruction is not detected:
capture the photograph when the haptic timer has expired;
send the photograph to the one or more other computing devices;
receive feedback from the one or more other computing devices regarding opinion of the one or more users regarding the photograph;
analyze the feedback to determine whether a consensus has been reached; and
when the consensus of the opinion of the one or more users regarding the photograph has been reached:
provide follow-up options regarding user interaction with the photograph to the one or more other computing devices;
when the obstruction is detected:
pause, by the camera computing device, the haptic timer;
send, by the camera computing device, a live view of the capture field to the one or more other computing devices;
prior to the obstruction being removed from the capture field, determine, by the camera computing device, whether a proceed command has been received from the one or more other computing devices;
when the obstruction has been removed or when the proceed command has been received, restart, by the camera computing device, the haptic timer; and send, by the camera computing device, a haptic timer restart message to the one or more other computing devices.

11. The camera computing device of claim 10, wherein the processing module is further operable to:
when the obstruction is detected:
pause the haptic timer;
send a haptic effect to the one or more other computing devices indicating that the haptic timer has been paused;
wait until the obstruction has been removed from the capture field;
restart the haptic timer; and
send a haptic timer restart message to the one or more other computing devices.

12. The camera computing device of claim 10, wherein the processing module is further operable to:
select the one or more users from a list of users associated with computing devices paired with the camera computing device.

13. The camera computing device of claim 10, wherein the processing module is further operable to:
select one or more individuals through a live view of the capture field using a touchscreen function;
identify the one or more individuals using a facial recognition function; and
perform a lookup of the identified one or more individuals in a database of registered users to correlate the identified one or more individuals to the one or more users associated with the corresponding one or more other computing devices.

14. The camera computing device of claim 10, wherein the feedback includes one or more of:
an indication that the photograph is satisfactory;
an indication that the photograph is not satisfactory; and
an indication that a camera function parameter requires an adjustment.

15. The camera computing device of claim 10, wherein the processing module is operable to determine whether a consensus of the opinion of the one or more users regarding the photograph has been reached by:
determining whether a threshold number of the one or more other computing devices has returned favorable feedback; and
when the threshold number of the one or more other computing devices has returned favorable feedback, determining that the consensus has been reached; and
when the threshold number of the one or more other computing devices has not returned favorable feedback, determining that the consensus has not been reached.

16. The camera computing device of claim 10, wherein, the follow-up options include one or more of:
download photograph;
transmit photograph;
post photograph to social media;
edit photograph; and
delete photograph.

17. The camera computing device of claim 10, wherein the processing module is operable to determine whether the obstruction is present in the capture field by one or more of:
detecting a moving object between the camera computing device and the one or more users;
detecting an individual in the capture field that is not the one or more users; and
detecting that facial features of a user of the one or more users is blocked.

18. The camera computing device of claim 10, wherein the processing module is further operable to:
when the consensus has not been reached:
when the feedback indicates that one or more camera parameters require adjustment:
adjust the one or more camera parameters in accordance with the feedback; and
send a second haptic timer to the one or more other computing devices to initiate countdown to taking a new photograph; and
when the feedback does not indicate that one or more camera parameters require adjustment:
send the second haptic timer to the one or more other computing devices to initiate countdown to taking the new photograph.

19. A computer program product comprising: one or more non-transitory computer readable storage media and program instructions stored on the one or more non-transitory computer readable storage media, the program instructions comprising:
program instructions to select one or more users in a capture field of the camera computing device, wherein the one or more users is associated with a corresponding one or more other computing devices;
program instructions to send a haptic timer to the one or more other computing devices, wherein the haptic timer alerts the one or more users to a countdown of when a photograph of the capture field will be taken;
program instructions to determine whether an obstruction is present in the capture field;
when an obstruction is not detected:
program instructions to capture the photograph when the haptic timer has expired;
program instructions to send the photograph to the one or more other computing devices;
program instructions to receive feedback from the one or more other computing devices regarding opinion of the one or more users regarding the photograph;
program instructions to analyze the feedback to determine whether a consensus has been reached; and
when the consensus of the opinion of the one or more users regarding the photograph has been reached:
program instructions to provide follow-up options regarding user interaction with the photograph to the one or more other computing device;
when the obstruction is detected:
program instructions to pause, by the camera computing device, the haptic timer;
program instructions to send, by the camera computing device, a live view of the capture field to the one or more other computing devices;
program instructions to prior to the obstruction being removed from the capture field, determine, by the camera computing device, whether a proceed command has been received from the one or more other computing devices;
program instructions to when the obstruction has been removed or when the proceed command has been received, restart, by the camera computing device, the haptic timer; and
program instructions to send, by the camera computing device, a haptic timer restart message to the one or more other computing devices.

* * * * *